Patented Jan. 29, 1935

1,989,425

UNITED STATES PATENT OFFICE 1,989,425

PRODUCTION OF BUTYLENE FROM ETHYLENE

Michael Otto and Leopold Bub, Ludwigshafen-on-the-Rhine, Germany, assignors to I. G. Farbenindustrie Aktiengesellschaft, Frankfort-on-the-Main, Germany, a corporation of Germany No Drawing. Application August 22, 1929, Serial No. 387,794. In Germany October 11, 1928

13 Claims. (Cl. 260—170)

This invention relates to improvements in the manufacture and production of butylene from ethylene which term also includes mixtures thereof with other substances.

It is already known that ethylene may be polymerized to an oily product, suitable for example as lubricating oil, by the action of boron fluoride, if desired in the presence of metallic catalysts. The action is effected under considerable pressure and extends over a long period of time.

We have now found that contrary to what would be expected, by the action for a period of time substantially shorter than that required for the formation of products liquid under normal conditions of temperature and pressure, on ethylene of boron fluoride or other anhydrous inorganic halogen componds, which are capable of volatilization by distillation or sublimation, and which when treated with water give rise to an evolution of heat and usually to a splitting off of halogen hydride, appreciable quantities of butylene can readily be obtained instead of the aforesaid oily products. As condensing agents may be mentioned for example the halogen compounds of the elements boron, aluminium, titanium, tin, phosphorus, arsenic, antimony, sulphur, selenium, iron and tungsten. Hydrofluoric acid also exhibits a certain activity, but the activity of the other halogen hydrides is very small. The amounts of the said halogen compounds added may be varied within wide limits. Additions of the said halogen compounds of up to about 5 per cent by weight of the ethylene will usually suffice, although where practicable more may be taken, the reaction then proceeding correspondingly quicker. Preferably the amount of the addition employed varies between 0.1 and 2 per cent.

Generally speaking the fluorine compounds are the most active, although it is usually satisfactory to employ the chlorine compounds. In certain cases the bromides and iodides are useful. Oxyhalides, such as phosphorus oxyfluoride have a moderate activity.

The halogen compounds may be employed alone or in admixture with one another or with other catalytic substances, for example surface active substances, such as finely divided metals, for example nickel and the like. In most cases the addition of organic halogen compounds, in particular those, the halogens of which are split off by means of the Friedel Crafts reaction, such as ethyl fluoride or chloride, have an accelerating effect on the reaction. Hydroxy compounds such as water or alcohols which react with the said inorganic halogen compounds to form hydrogen halides also have an accelerating action when added.

It is preferable to work under such conditions of temperature and pressure that the ethylene is present in the liquid state. It has been found to be advantageous in many cases to employ a solvent for the ethylene and the halogen compound. Moreover, many of the said inorganic halogen compounds may be employed in the form of their double compounds. The reaction is usually carried out at pressures ranging between 5 and 100 atmospheres. Where practicable higher pressures such for example as 200 atmospheres or even more may be employed. Lower pressures and even atmospheric may also be employed in certain cases. Preferably, however, pressures of between about 30 and 80 atmospheres are employed.

The following examples will further illustrate the nature of this invention but the invention is not restricted thereto.

Example 1

Liquid ethylene together with about 0.3 to 2 per cent by weight of gaseous boron fluoride is led at the rate of from ½ to 1 litre per hour and under a pressure of 50 atmospheres through a pressure tight tube in which there is 1 litre of a catalyst consisting of finely divided nickel on a suitable carrier substance, in such a manner that the catalyst is continually covered by the ethylene. The temperature is kept at from 8° to 10° centigrade. Under these conditions 200 cubic centimetres of $\beta$-butylene per hour can be recovered from the gas mixture leaving the tube.

Example 2

An ethylene pressure of about 60 atmospheres is maintained in an autoclave of about 4 litres' capacity filled with Raschig rings. 1 to 2 cubic centimetres of anhydrous hydrogen fluoride are added per hour whereby 30 to 40 cubic centimetres of butylene are produced in the said period of time.

Example 3

If the process described in Example 2 is carried out in an analogous manner in the presence of nickel up to ½ litre of butylene is obtained per hour when working in this way.

Example 4

If in the process according to Example 3 a little boron fluoride (less than 0.4 per cent) be also present 1.5 litres of butylene are obtained per hour. The processes according to Examples 2, 3 and 4 are carried out at room temperature.

What we claim is:—

1. A process for the production of butylene from ethylene which comprises polymerizing ethylene by contacting it with a catalyst selected from the group consisting of hydrogen fluoride and inorganic anhydrous volatilizable metal and metalloid halogen compounds, which give rise to an evolution of heat when treated with water, for a period of time substantially shorter than that required for the formation of normally liquid products from ethylene under the same operating conditions.

2. A process for the production of butylene from ethylene which comprises polymerizing ethylene by contacting it, under such conditions of temperature and pressure that it is liquid, with a catalyst selected from the group consisting of hydrogen fluoride and inorganic anhydrous volatilizable metal and metalloid halogen compounds, which give rise to the evolution of heat when treated with water, for a period of time substantially shorter than that required for the formation of normally liquid products from ethylene under the same operating conditions.

3. A process for the production of butylene from ethylene which comprises polymerizing ethylene by contacting it with a catalyst selected from the group consisting of hydrogen fluoride and inorganic anhydrous volatilizable metal and metalloid halogen compounds, which give rise to an evolution of heat when treated with water, and with finely divided nickel for a period of time substantially shorter than that required for the formation of normally liquid products from ethylene under the same operating conditions.

4. A process for the production of butylene from ethylene which comprises polymerizing ethylene by contacting it at a temperature up to 100° C. and under a pressure ranging between 30 and 80 atmospheres with a catalyst selected from the group consisting of hydrogen fluoride and inorganic anhydrous volatilizable metal and metalloid halogen compounds, which give rise to an evolution of heat when treated with water, for a period of time substantially shorter than that required for the formation of normally liquid products from ethylene under the same operating conditions.

5. A process for the production of butylene from ethylene which comprises polymerizing ethylene by contacting it with a catalyst selected from the group consisting of inorganic anhydrous volatilizable metal and metalloid halogen compounds, which give rise to an evolution of heat when treated with water and hydrogen fluoride, in the presence of an organic halogen compound capable of splitting off halogen in the presence of said catalyst, for a period of time substantially shorter than that required for the formation of normally liquid products from ethylene under the same operating conditions.

6. The process according to the preceding claim in which the organic halogen compound is selected from the group consisting of ethyl fluoride and ethyl chloride.

7. A process for the production of butylene from ethylene which comprises polymerizing ethylene by contacting it under a pressure of between 5 and 100 atmospheres with a catalyst selected from the group consisting of hydrogen fluoride and inorganic anhydrous volatilizable metal and metalloid halogen compounds, which give rise to an evolution of heat when treated with water, for a period of time substantially shorter than that required for the formation of normally liquid products under the same operating conditions.

8. The process for the production of butylene from ethylene which comprises polymerizing ethylene by contacting it at a temperature of between 8° C. and room temperature with a catalyst selected from the group consisting of hydrogen fluoride and inorganic anhydrous volatilizable metal and metalloid halogen compounds, which give rise to an evolution of heat when treated with water, for a period of time substantially shorter than that required for the formation of normally liquid products from ethylene under the same operating conditions.

9. The process for the production of butylene from ethylene which comprises polymerizing ethylene by contacting it with an inorganic anhydrous volatilizable compound of fluorine for a period of time substantially shorter than that required for the formation of normally liquid products from ethylene under the same conditions.

10. A process for the production of butylene from ethylene which comprises polymerizing ethylene by contacting it with an inorganic volatilizable compound of fluorine and with finely divided nickel for a period of time substantially shorter than that required for the formation of normally liquid products from ethylene under the same operating conditions.

11. A process according to claim 10 in which the compound of fluorine employed is boron fluoride.

12. A process for the production of butylene from ethylene, which comprises polymerizing ethylene with an inorganic volatilizable compound of fluorine as catalyst and finely divided nickel for a period of time substantially shorter than that required for the formation of normally liquid products under the same operating conditions.

13. A process for the production of butylene from ethylene, which comprises passing liquid ethylene together with about 0.3 to 2 per cent of boron fluoride at a rate of from ½ to 1 litre per hour per litre of catalyst under a pressure of about 50 atmospheres over a catalyst consisting of finely divided nickel on a suitable carrier substance and maintaining a temperature of from 8 to 10° C.

MICHAEL OTTO.
LEOPOLD BUB.